United States Patent [19]

Uno et al.

[11] 4,352,545
[45] Oct. 5, 1982

[54] CAMERA FOCUS DETECTING DEVICE

[75] Inventors: Naoyuki Uno, Urawa; Masao Jyojiki, Tsurugashima; Harumi Aoki, Kiyose, all of Japan

[73] Assignee: Asahi Kogaku Kogyo Kabushiki Kaisha, Tokyo, Japan

[21] Appl. No.: 117,589

[22] Filed: Feb. 1, 1980

[30] Foreign Application Priority Data

Feb. 13, 1979 [JP] Japan ................................ 54-15255
Feb. 16, 1979 [JP] Japan ................................ 54-16948

[51] Int. Cl.³ ........................... G03B 3/10; G03B 7/08
[52] U.S. Cl. ....................................... 354/25; 250/204
[58] Field of Search ................. 354/25, 195; 250/204, 250/201; 350/46; 352/140; 355/56

[56] References Cited

U.S. PATENT DOCUMENTS

3,450,883 6/1969 Thomas .............................. 250/204
4,220,850 9/1980 McEachern ......................... 354/25

OTHER PUBLICATIONS

IBM Technical Disclosure Bulletin, vol. 15, No. 2, Jul. 1972, pp. 504, 505, Optical Surface Microtopography Measurement and/or Automatic Focussing.

Primary Examiner—G. Z. Rubinson
Assistant Examiner—Stafford D. Schreyer
Attorney, Agent, or Firm—Sughrue, Mion, Zinn, Macpeak & Seas

[57] ABSTRACT

An automatic focus detecting device for a camera adapted to be miniaturized and provided in the form of an integrated circuit. Two arrays of light receiving elements or sensors are disposed in two planes parallel to the surface of the film in the camera on either side of the image plane. The output signals from the sensors are processed in a disclosed electronic circuit to detect desired focus conditions such as front focus, proper focus and rear focus for automatically moving the photographing lens to the position of proper focus.

10 Claims, 14 Drawing Figures

CAMERA FOCUS DETECTING DEVICE

BACKGROUND OF THE INVENTION

The present invention relates to focus detecting devices for cameras. More particularly, the invention relates to a device for detecting the contrast of an image formed by a photographing lens to detect focalization.

It has been known in the art that the relation between the amount of non-focalization, specifically, the distance between the plane of an image at the point of focalization and the plane of an image at the point of non-focalization and the amount of high frequency components of the spatial frequency spectrum of an image can be represented by a symmetrical characteristic curve having a single peak as shown in FIG. 1. Accordingly, as the amount of non-focalization increases the amount of high frequency component decreases.

A technique for detecting the amount of high frequency components has been known in which an array of light receiving elements having uniform photoelectric characteristic and arranged along a straight line is disposed in a plane parallel to the plane of an image. In this arrangement, the amount of high frequency components is detected from the sum of the differences in output between adjacent light receiving elements. For convenience for the description, which follows the amount of high frequency components thus determined will be referred to hereinafter as "a contrast output".

SUMMARY OF THE INVENTION

An object of this invention is to provide a device in which two arrays of light receiving elements for contrast detection (hereinafter referred to as "sensors" when applicable) are disposed in two planes parallel to the surface of a film in a camera and contrast outputs provided by the two arrays are compared in order to detect various focusing conditions such as front focus, focus and rear focus.

These, as well as other objects of the invention, are met by a focusing device for a camera including an optical planar plate having incorporated therein a beam splitter for passing a first part of light from a photographing lens and reflecting the remaining part thereof and a reflecting surface for directing the reflected light along a parallel path to the first part of the light, and a pair of light receiving elements provided in a plane parallel to the optical planar plate in such a manner that the optical distance of one of the light receiving elements from the photographing lens is different from that of the other light receiving element. The two light receiving elements respectively receive images formed by the first and remaining parts of the light wherein focalization states are determined, that is, calculated from differences in the amount of focalization of images which are formed on the pair of light receiving elements by the photographing lens. Preferably, the optical planar plate is disposed so as to serve as a cover for the light receiving elements. The light receiving elements are each preferably a self-scanning type image sensor, that is, an array of individual light sensing elements. The optical planar plate may be covered with a light shielding material for preventing unwanted light from entering therein.

DESCRIPTION OF THE PREFERRED EMBODIMENTS

Figure 1:
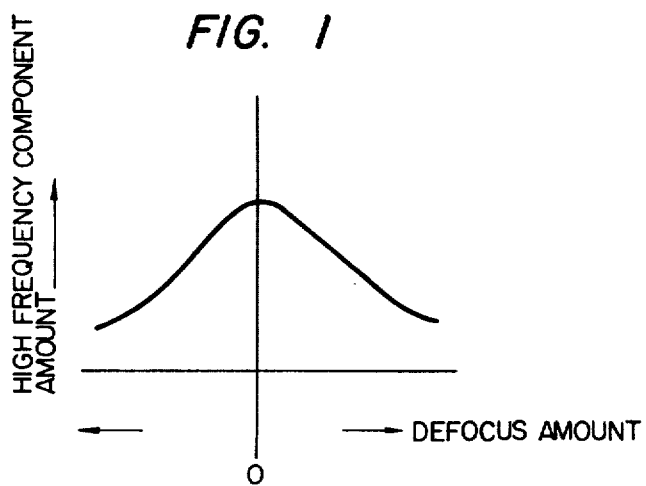
FIG. 1 is a graph showing the amount of high frequency components vs. the state of focalization in the plane of an image.
Figure 2:
FIG. 2 is a diagram showing an array of sensors used in a device of the invention.
Figure 3:
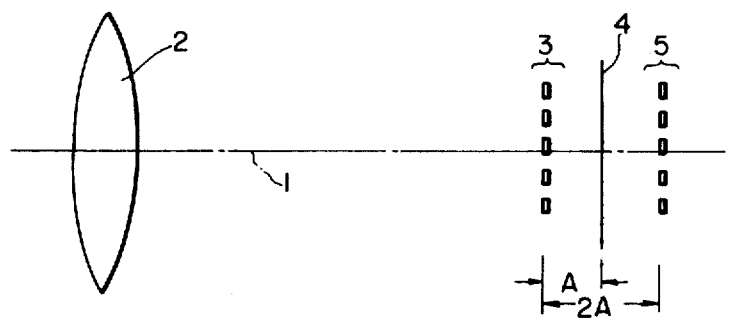
FIG. 3 is a cross sectional view of the lens and two arrays of sensors erased to illustrate the principle of operation of the present invention.

The principle of the present invention will first be described with reference to FIG. 3 in which reference numeral 1 designates the optical axis of a photographing lens 2; 4, the surface of a film; and 3 and 5, sensors. The sensor 3 is spaced by a distance A toward the lens 2 from the film surface 4 while the sensor 5 is spaced by the same distance A in the opposite direction from the film surface 4. These components are position such that during exposure the sensor 3, the film surface 4 and the sensor 5 do not obstruct one another. When the plane of an image formed by the photographing lens 2 is between the film surface 4 and the lens, namely at the front focus, the contrast output of the sensor 3 is greater than that of the sensor 5. On the contrary, when the plane of an image formed by the lens 2 is behind the film surface 4 at the rear focus, the contrast output of the sensor 5 is greater than that of the sensor 3. When the image is formed on the film surface, the contrast output of the sensor 3 is equal to that of the sensor 5.

Figure 5:
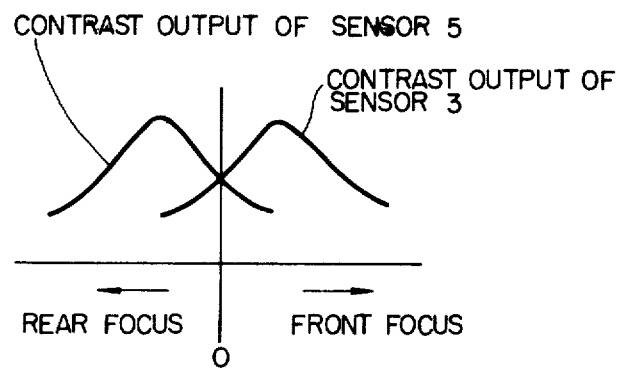
FIG. 5 is a graph showing the outputs from two rows of sensors as the lens position is changed.

This will become more apparent from the graphical representation of FIG. 5. When the result obtained by subracting the contrast output of the sensor 3 from the contrast output of the sensor 5 is positive in sign, rear focus is indicated. If the result is negative in sign, front focus is indicated. When the two contrast output are equal to each other, then proper focalization has been achieved.

Figure 4:
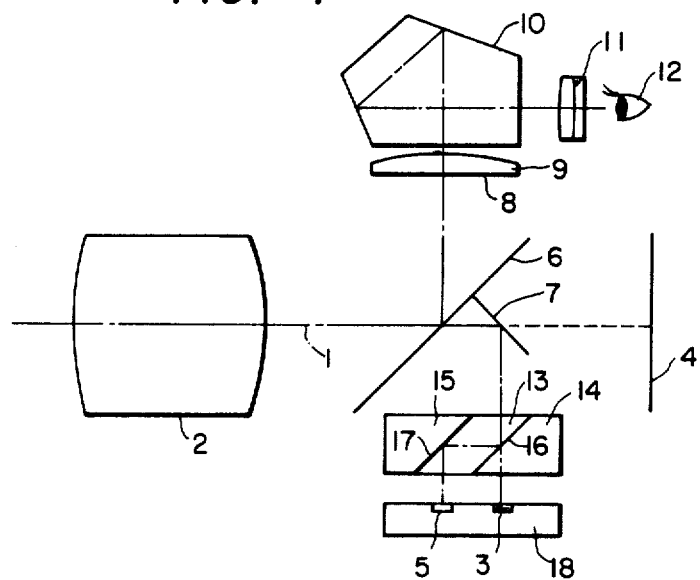
FIG. 4 is a cross sectional view of a single-lens reflex camera incorporating a focus detecting device according to the invention.

An embodiment of a single-lens reflex camera incorporating a focus detecting device according to the invention is shown in FIG. 4. Light passing through a photographing lens 2 is divided into two parts by a half-silvered mirror 6. One of the two parts is directed upwardly by the half-silvered mirror and passes through a focusing surface 8, a condenser lens 9, a penta-prism 10 and a magnifier 11 to an eye 12 of the user. The other part is reflected downwardly by a second mirror 7, entering an optical system including glass blocks 13, 14 and 15. The light in the optical system is divided into two parts by a half-silvered mirror 16. One of the two parts advances straightly to a sensor 3 while the other is reflected by the half-silvered mirror 16 and a mirror 17 to a second sensor 5. The distance of the sensor 3 from the photographing lens 2 is different from the distance of the sensor 5 from the lens 2 and the difference between the two distances is 2A as shown in FIG. 3. That is, the distance is equal to a value which is obtained by dividing the distance between the sensors 3 and 5 by the refractive index of the glass block 3 if the indication angles of the mirrors 16 and 17 with respect to the optical axis are 45°.

A plane whose optical distance from the photographing lens 2 is equal to the distance between the film surface 4 and the lens 2 will be referred to as "a film equivalent plane". The film equivalent plane is at the middle point between the sensors 3 and 5.

Figure 10:
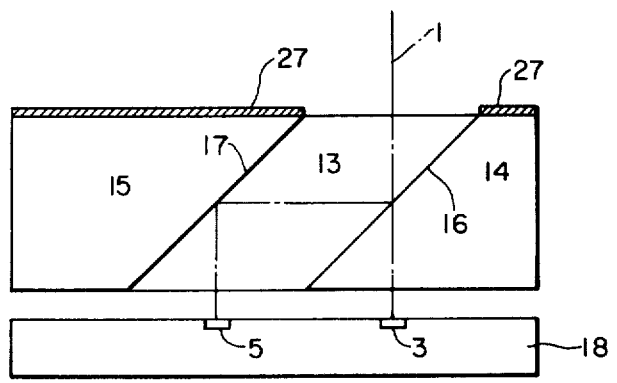
FIG. 10 is an enlarged view showing the sensors and glass blocks of the embodiment of FIG. 4 in more detail.
Figure 11:
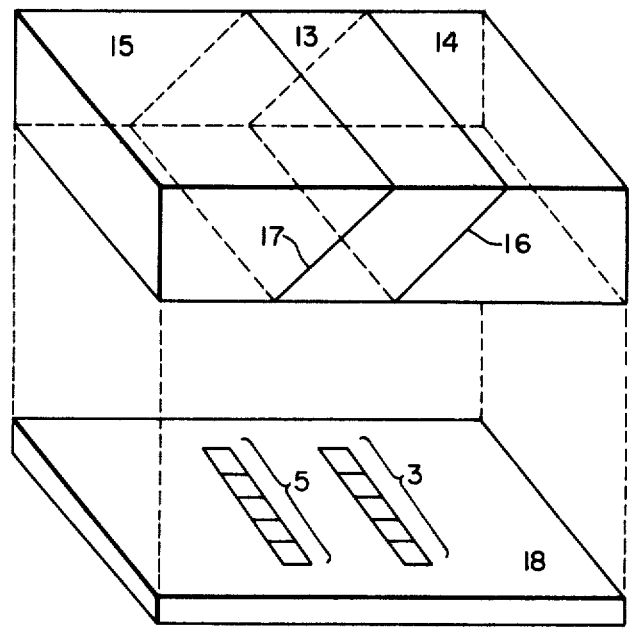
FIG. 11 is a perspective view of the glass blocks and sensors of FIG. 10.

FIG. 10 is an enlarged view showing the sensors and the glass blocks in more detail. In FIG. 10, reference numeral 18 designates a substrate supporting the sensors 3 and 5 and reference numeral 27 designates a light shielding plate to block unwanted light. FIG. 11 is a perspective view of the glass blocks 13, 14 and 15 and the sensors 3 and 5 the direction of arrangement of the sensors and the disposition of the mirror 17 and the half-silvered mirror 16.

Figure 6:
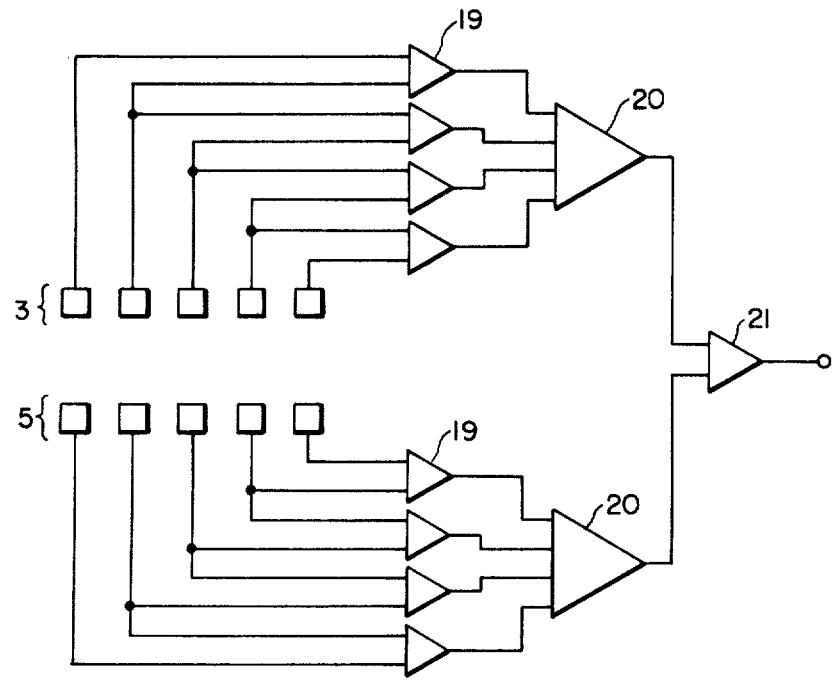
FIG. 6 is a circuit diagram showing an example of a processing circuit for processing the outputs of the sensors.

FIG. 6 is a circuit diagram showing an example of a processing circuit for processing the outputs of the sensors. The operation of the processing circuit which is carried out until a difference output between contrast outputs is obtained from the outputs of the sensors will be described. In the circuit shown in FIG. 6, each of the sensors 3 and 5 has five light receiving elements which are uniform in their photoelectric characteristics. The outputs of two adjacent light receiving elements are compared by a circuit 19 so as to determine the absolute value of the difference between the outputs. The absolute values thus obtained are summed in addition circuit 20 whereby a contrast output is provided.

Figure 7:
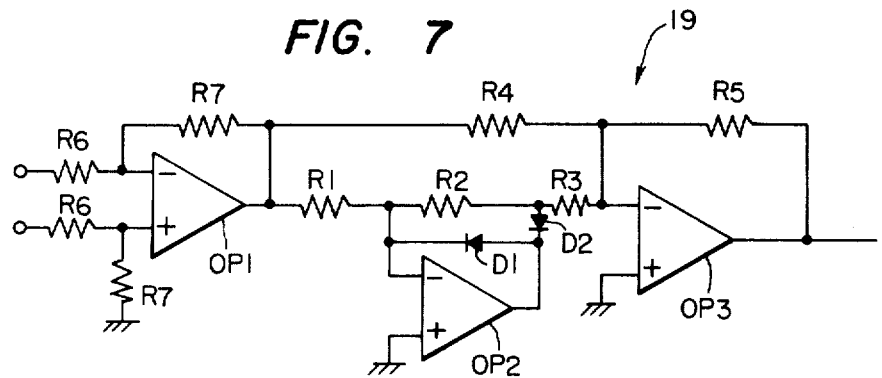
FIG. 7 is a circuit diagram of a circuit for determining the absolute value of the difference between the sensor outputs.
Figure 8:
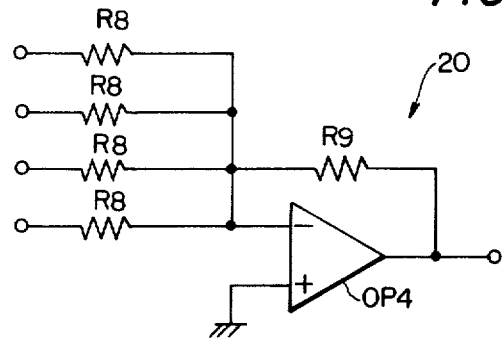
FIG. 8 is a circuit diagram of an adder circuit as used in the circuit of FIG. 6.

An example of the circuit 19 provided for determining the absolute value of the difference between the outputs as shown in FIG. 7. This circuit includes an operational amplifier $OP_1$ for determining the difference between the two signals supplied through two resistors $R_6$ and a circuit including operational amplifier $OP_2$ and $OP_3$ diodes $D_1$ and $D_2$ and resistors $R_1$ through $R_5$. One example of the addition circuit 20 is shown in FIG. 8.

Referring back to FIG. 6, the contrast outputs of the sensors 3 and 5 are obtained with the circuits 19 and 20. The two contrast outputs have characteristic curves as indicated in FIG. 5. The difference between the two contrast outputs is determined by a differential amplifier 21 as a result of which a front focus signal, focus signal or rear focus signal is provided.

The focus detecting device according to the invention in which two arrays of sensors are used to detect front focus, focus and rear focus, unlike a conventional focus detecting device in which a single sensor is used and variations of the contrast output are detected by extending the photographing lens, is free from nonfocalization which is attributed to movement of the image on the sensor which may result from shaking the camera. In addition, the device according to the invention is free from difficulties such as those found in a system as disclosed in Japanese Laid-Open Patent Application No. 79531/1978 such as shaking of a camera and the corresponding lowering of characteristics due to a time delay required for switching two parts of a single line sensor, the necessity of minituarizing the optical system, and problems in increasing the size of the image pickup element.

Although two arrays of sensors 3 and 5 are employed, the sensors 3 and 5 can be formed on the same substrate. Furthermore the three glass blocks and the mirror 17 and the half-silvered mirror 16 interposed therebetween can be formed as a single glass plate. Therefore, integrated circuit techniques, which have reached a high state of development can be effectively applied to the device according to the invention. That is, the arrays of light receiving elements, the processing circuit and the optical arrangement can be formed as a single unit which can be incorporated in a panel as if it were a single sensor. If a silicon wafer is employed as the substrate 18 in FIG. 11, then the sensors 3 and 5 and the signal processing circuit shown in FIG. 6 can be formed on the wafer. In practice, the distance between the sensors 3 and 5 is from one to several millimeters. Therefore, the thickness of the glass block assembly will typically be on the order of 1 mm in the direction of the optical axis. Accordingly, the entire glass block assembly of a device of the invention occupies substantially the same space as the cover glass of an ordinary line sensor.

Figure 13:
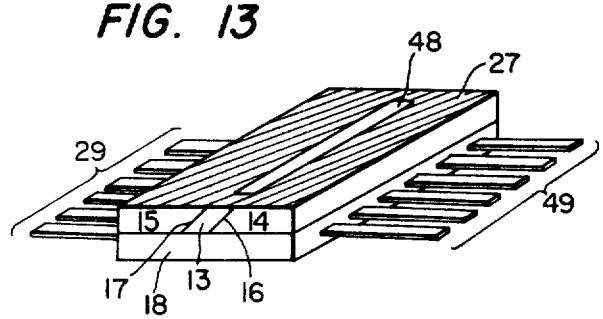
FIG. 13 is a perspective view showing an example of an embodiment of the invention formed in a flat package utilizing integrated circuit techniques.

FIG. 13 is a perspective view showing an example of a device of the invention formed in a flat package utilizing integrated circuit techniques. The device includes a light shielding plate 27 for preventing light from entering the inside of the device with the plate 27 having an opening 48 for allowing light to be applied to the glass block 13, input and output pins 29 and 49 of the processing circuit made in the form of an integrated circuit, and a package 18 made, for instance, of ceramic.

In FIG. 13, the sides of the glass block assembly are exposed so that the arrangement of the glass blocks 13, 14 and 15, the half-silvered mirror 16 and the mirror 17 can be readily understood. However, it is preferable that the sides be coated with light shielding material. It can be understood from FIG. 13 that the size of the device is small enough to be mounted in a camera.

Since the front focus signal, the focus signal and the rear focus signal are provided with a device according to the invention, an automatic focus adjustment device can be readily manufactured using such a device. A self-scanning type image sensor can be employed as the aforementioned sensor. Examples of the self-scanning type image sensor are one using an analog charge transfer element such as a CCD or a BBD and an MOS shift registor type element.

Figure 9:
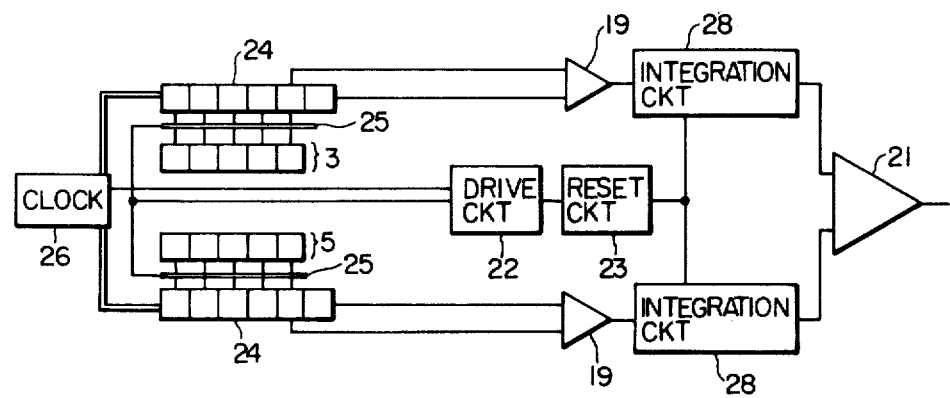
FIG. 9 is a circuit diagram showing a signal processing circuit employing an analog charge transfer element.

FIG. 9 is a circuit diagram showing an example of a signal processing circuit employing the analog charge transfer element. The outputs of the arrays of light receiving elements 3 and 5 are simultaneously transferred through transfer gates 25 to analog shift registers 24 where they are successively shifted to the right (as viewed in the figure) by transferring clock pulses produced by a clock pulse generator 26. The number of stages in the analog shift register 24 is larger by one bit than the number of light receiving elements. The analog shift register 24 includes taps so that the signal of the last stage and the signal of the stage immediately before the last stage can be outputted at the same time. In this manner, the outputs of adjacent light receiving elements are simultaneously applied to a comparison circuit 19. The comparison circuit 19 is similar to the circuit shown in FIG. 7. That is, it is arranged to provide the absolute value of the difference between the two outputs of adjacent light receiving elements. The difference absolute value signal which is outputted by the comparison circuit 19 is integrated to form a contrast signal by an integration circuit 28. It should be noted that, in this case, the contrast output is in the form of a voltage.

Figure 12:
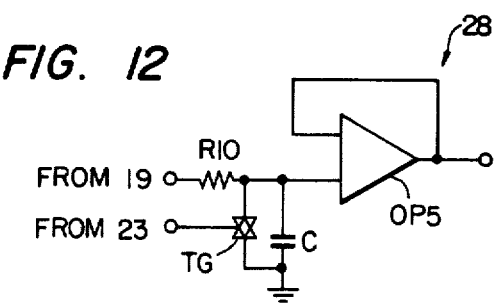
FIG. 12 shows a circuit diagram of an integrated circuit used with a preferred embodiment of the invention.

An example of the integration circuit 28, as shown in FIG. 12, includes a resistor $R_{10}$, an operational amplifier $OP_5$, a capacitor C, and a transfer gate TG to integrate the difference absolute value signals for one scanning period.

Referring back to FIG. 9, reference numeral 23 designates a reset circuit for the integration circuit 28. The reset circuit 23 operates to reset the contrast output each scanning period. Connected to the reset circuit 23 is a drive circuit for the transfer gates 25. Two contrast outputs provided through the integration circuits 28 are compared by a differential amplifier 21 whereby, similarly to the above-described case, one of the front focus signal, the focus signal and the rear focus signal is provided. More specifically, when the contrast output of the sensor 5 is greater than that of the sensor 3, a positive signal is outputted, when the two contrast outputs are equal, a zero signal is provided, and when the contrast output of the sensor 5 is smaller than that of the sensor 3, a negative signal is provided. That is, when the point of focalization has been reached, the zero signal is outputted, the positive signal is outputted for front focus, and the negative signal is provided for rear focus.

With a self-scanning image sensor, the output signal may become saturated or the output signal may become so small that it is buried in noise. This difficulty can be eliminated by the provision of a second example of the focus detecting device according to the invention which will be described with reference to FIG. 14. Glass blocks 13, 14 and 15 and sensors 3 and 5 employed in the second example are substantially similar to those shown in FIGS. 10 and 11. However, it should be noted that light receiving elements $M_1$ and $M_2$ are additionally provided adjacent to the sensors 3 and 5 so that they receive light from the photographing lens which has passed through the half-silvered mirror 16 and light reflected by the mirror 17, respectively. The processing circuit shown in FIG. 9 can be employed for processing the outputs of these light receiving elements. However, the clock pulse generator 26 would then operate to generate clock pulses having frequencies proportional to the outputs of the light receiving elements $M_1$ and $M_2$.

Figure 14:
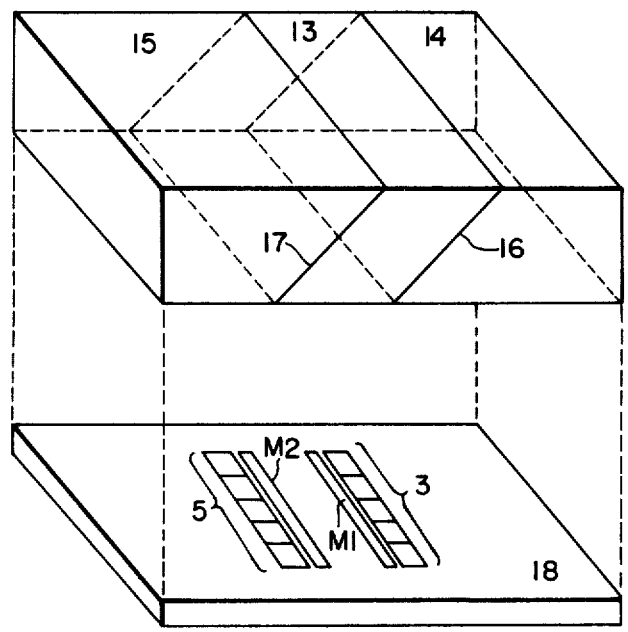
FIG. 14 shows a second embodiment of a focus detecting device according to the invention.

Light applied to the sensors 3 and 5 may be different in intensity from light applied to the light receiving elements $M_1$ and $M_2$. However, in practice, the difference in intensity can be neglected with the device according to the invention. In FIG. 14, the sensors 3 and 5 observe the same object to be photographed although the optical distance of the sensor 3 from the photographing lens is different from that of the sensor 5 and light on the left of the sensor 3 is applied to the light receiving element $M_1$ while light on the right of the sensor 5 is applied to the light receiving element $M_2$. Thus, the light receiving elements $M_1$ and $M_2$ detect the quantities of light on both adjacent sides of the object which is observed by the sensors 3 and 5.

In the second example of the device this constructed, the quantities of light on both sides of the sensors 3 and 5 are metered by the light receiving elements $M_1$ and $M_2$ to estimate the quantities of light on the sensors 3 and 5 so that the scanning rate of the sensors may be changed to control the optical sensitivities of the sensors 3 and 5. Thus, the focus detecting device according to the invention is suitable for use with a variety of objects which are different in brightness.

As is clear from the above description, with the invention, focalization and non-focalization can be detected positively. Accordingly, the device according to the invention, unlike a conventional focus detecting device in which a single-sensor is used and variation of the contrast output is detected by moving the photographing lens, is free from the difficulties in detecting the point of focalization attributed to movement of the image of an object on the sensor such as may be caused by shaking the camera when the photographing lens is extended.

The device may be so arranged that the film surface does not lie between the sensors 3 and 5. When the plane of an image is at the midpoint between the sensors 3 and 5, the contrast output of the sensor 3 is equal to that of the sensor 5. However, with this arrangement, the device can be operated irrespective of whether or not the film surface is at the midpoint between the sensors 3 and 5. For instance, it is assumed that, when the film surface is moved by a particular value towards the rear focus side from the position "0" in FIG. 5, the particular value is represented by $\Delta x$. Then, the contrast output of the sensor 3 is equal to that of the sensor 5 only at the point of front focus. Accordingly, if the value $\Delta x$ is known, the focalization position, which is the position at which the amount of non-focalization is zero, can be determined. Thus, even when the positions of the sensors 3 and 5 and the film surface are not defined, the focalization position can be determined if the amount of shift of the film surface is known.

In the example described above, although two arrays of sensors are provided on both sides of the film surface, plural glass blocks assembled in the form of a sheet of glass plate, the mirror and the half-silvered mirror interposed between the glass blocks and the sensors 3 and 5 formed on the substrate are assembled as a single unit. That is, the light receiving elements, the light receiving element arrays, the processing circuit and the optical system are assembled as one unit, as shown in FIGS. 4, 10, 11 and 14. Thus, a focus detecting device according to the invention can be incorporated in a panel as in the case of a single line sensor. Accordingly, utilizing integrated circuit techniques, the focus detecting device of the invention can be readily implemented. In the devices shown in FIGS. 4, 10, 11 and 14, a silicon wafer may be employed as the substrate 18 with the sensors and the signal processing circuit formed on the silicon wafer. In practice, it is sufficient that the sensors 3 and 5 be spaced several millimeters from each other. In addition, the thickness of the glass block assembly may be reduced to less than several millimeters and, accordingly, the device can be incorporated in a space which is substantially equal to the space for the cover glass of an ordinary line sensor.

What is claimed is:

1. A focus detecting device for a camera comprising: a flat package assembly having an optical planar plate including a beam splitter for passing a first part of light from a photographing lens and reflecting the remaining part thereof and a reflecting surface for directing said reflected light in parallel with said first part of light; and a substrate below said optical planar plate having a pair of light receiving elements provided in a plane in parallel to said optical planar plate in such a manner that the optical distance of one of said light receiving elements from said photographing lens is different from the optical distance of the other light receiving element from said photographing lens, said light receiving elements receiving images formed by said first and remaining parts of light wherein focalization states are determined from the difference in focalization of images which are formed on said pair of light receiving elements by said photographing lens.

2. A device as claimed in claim 1 wherein said optical planar layer is disposed to serve as a protective cover of said light receiving elements.

3. A device as claimed in claim 1 wherein said light receiving elements comprise a pair of self-scanning type image sensors.

4. A device as claimed in claim 1 wherein said optical planar layer is covered with a light shielding material for preventing unwanted light from entering thereinto.

5. A device as claimed in claim 1 wherein a sensor assembly is formed comprising; said optical planar plate and an integrated circuit on said substrate and, said substrate is a silicon wafer.

6. A device as claimed in claim 1 or 5 further comprising a signal processing circuit formed on said substrate and input and output terminals for said signal processing circuit formed on said substrate.

7. A device as claimed in claim 5 wherein said light receiving elements are formed on said silicon wafer.

8. A device as claimed in claim 1 further comprising a pair of additional light receiving elements provided adjacent said pair of light receiving elements to receive light from said photographing lens.

9. A device as claimed in claim 8 wherein said pair of additional light receiving elements are provided parallel to said pair of light receiving elements and said pair of light receiving elements and said additional pair are all formed on said substrate.

10. A device as claimed in claim 1, further comprising a light shielding plate positioned on said optical planar plate for preventing light from entering said flat package assembly.

* * * * *